US010042577B2

(12) United States Patent
Leggette et al.

(10) Patent No.: US 10,042,577 B2
(45) Date of Patent: Aug. 7, 2018

(54) STORING AND RETRIEVING MUTABLE OBJECTS

(71) Applicant: International Business Machines Corporation, Armonk, NY (US)

(72) Inventors: Wesley B. Leggette, Chicago, IL (US); Jason K. Resch, Chicago, IL (US); Eric G. Smith, Chicago, IL (US); Sebastien Vas, Sunnyvale, CA (US); Yogesh R. Vedpathak, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/342,238

(22) Filed: Nov. 3, 2016

(65) Prior Publication Data
US 2017/0052733 A1 Feb. 23, 2017

Related U.S. Application Data

(63) Continuation-in-part of application No. 15/095,558, filed on Apr. 11, 2016, which is a continuation-in-part (Continued)

(51) Int. Cl.
*G06F 3/06* (2006.01)
*G06F 11/10* (2006.01)

(52) U.S. Cl.
CPC .......... *G06F 3/0644* (2013.01); *G06F 3/0604* (2013.01); *G06F 3/064* (2013.01);
(Continued)

(58) Field of Classification Search
CPC ............. G06F 11/1068; G06F 11/1076; G06F 11/1012; G06F 11/1044; G06F 11/1008; H03M 13/13; H03M 13/45; H03M 13/458
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — James C Kerveros
(74) *Attorney, Agent, or Firm* — Garlick & Markison; Timothy W. Markison; Randy W. Lacasse

(57) ABSTRACT

A method for execution by one or more processing modules of one or more computing devices of a dispersed storage network (DSN), the method begins by identifying a data object to access within a DSN. The method continues by identifying a vault ID based on the data object. The method continues by obtaining an object ID based on the data object. The method continues by selecting at least one generation ID based on generation status. The method continues, for each generation ID, by generating at least one set of slice names using the vault ID, the generation ID, and the object ID. The method continues, for each set of slice names, by generating a set of slice access requests that includes the set of slice names and accessing the DSN utilizing the set of slice access requests.

16 Claims, 6 Drawing Sheets

Related U.S. Application Data of application No. 14/088,794, filed on Nov. 25, 2013, now Pat. No. 9,311,187.

(60) Provisional application No. 61/748,891, filed on Jan. 4, 2013.

(52) U.S. Cl.
CPC ............ *G06F 3/067* (2013.01); *G06F 3/0619* (2013.01); *G06F 11/1068* (2013.01); *G06F 11/1076* (2013.01); *G06F 11/1092* (2013.01); *G06F 11/1008* (2013.01); *G06F 11/1044* (2013.01); *G06F 2211/1028* (2013.01)

(58) Field of Classification Search
USPC ........................................................ 714/763
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1* | 7/2002 | Walker ................ G06F 11/2058 714/5.1 |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 7,739,579 B2* | 6/2010 | Kameyama ......... G06F 11/1076 714/769 |
| 8,234,545 B2* | 7/2012 | Shalvi ................ G06F 11/1068 714/768 |
| 2002/0062422 A1 | 5/2002 | Butterworth et al. | |
| 2002/0166079 A1* | 11/2002 | Ulrich ................... G06F 9/5083 714/6.12 |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1* | 6/2005 | Redlich ............... G06F 21/6209 709/228 |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1* | 7/2006 | Kitamura ............ G06F 11/1092 714/6.21 |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0251075 A1* | 9/2010 | Takahashi ........... G06F 11/1068 714/773 |
| 2011/0060967 A1* | 3/2011 | Warren ............... G06F 11/1048 714/773 |
| 2011/0072331 A1* | 3/2011 | Sakaue ............... G06F 11/1012 714/763 |
| 2013/0024748 A1* | 1/2013 | Sharon ................ G06F 11/1072 714/773 |
| 2013/0061087 A1* | 3/2013 | Kopylovitz ........... G06F 11/106 714/6.3 |
| 2013/0104002 A1* | 4/2013 | Hara .................... G06F 11/1072 714/763 |
| 2013/0173990 A1* | 7/2013 | Li ........................ G11B 20/1833 714/763 |
| 2013/0305120 A1* | 11/2013 | Torii ................... G06F 11/1008 714/764 |
| 2013/0311854 A1* | 11/2013 | Tsunehiro ........... G06F 11/1068 714/773 |
| 2014/0136915 A1* | 5/2014 | Hyde .................. G06F 11/0703 714/747 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

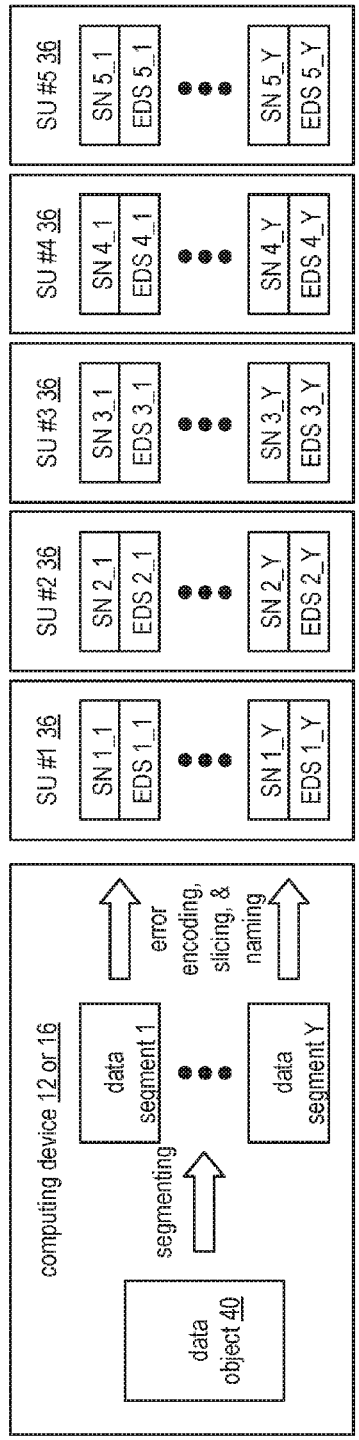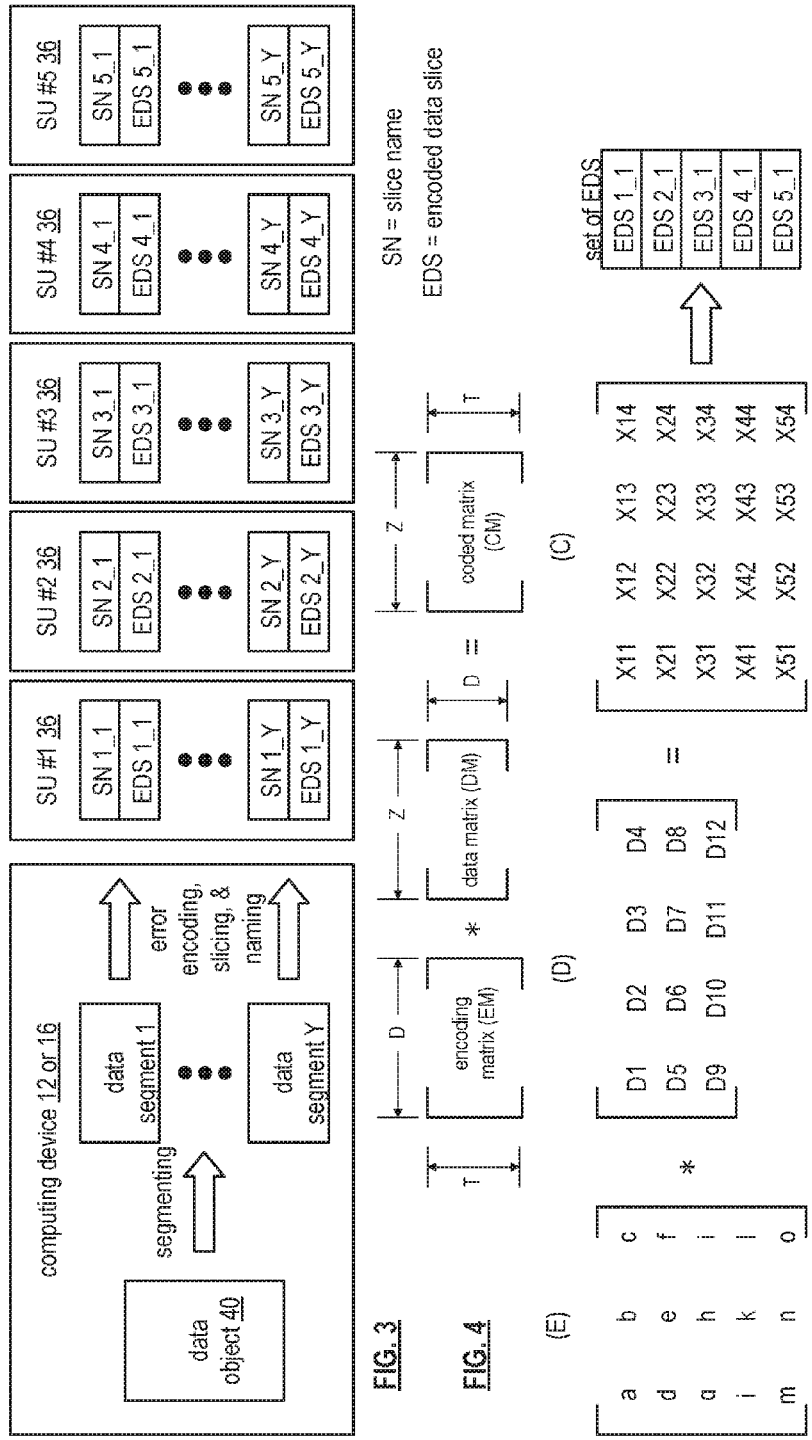
FIG. 3
FIG. 4
FIG. 5
FIG. 6

STORING AND RETRIEVING MUTABLE OBJECTS

CROSS-REFERENCE TO RELATED APPLICATIONS

The present U.S. Utility patent application claims priority pursuant to 35 U.S.C. § 120 as a continuation-in-part of U.S. Utility application Ser. No. 15/095,558, entitled "ACHIEVING STORAGE COMPLIANCE IN A DISPERSED STORAGE NETWORK", filed Apr. 11, 2016, which is a continuation-in-part of U.S. Utility application Ser. No. 14/088,794, entitled "ACHIEVING STORAGE COMPLIANCE IN A DISPERSED STORAGE NETWORK," filed Nov. 25, 2013, now U.S. Pat. No. 9,311,187, which claims priority pursuant to 35 U.S.C. § 119(e) to U.S. Provisional Application No. 61/748,891, entitled "OBFUSCATING AN ENCRYPTION KEY IN A DISPERSED STORAGE NETWORK," filed Jan. 4, 2013, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
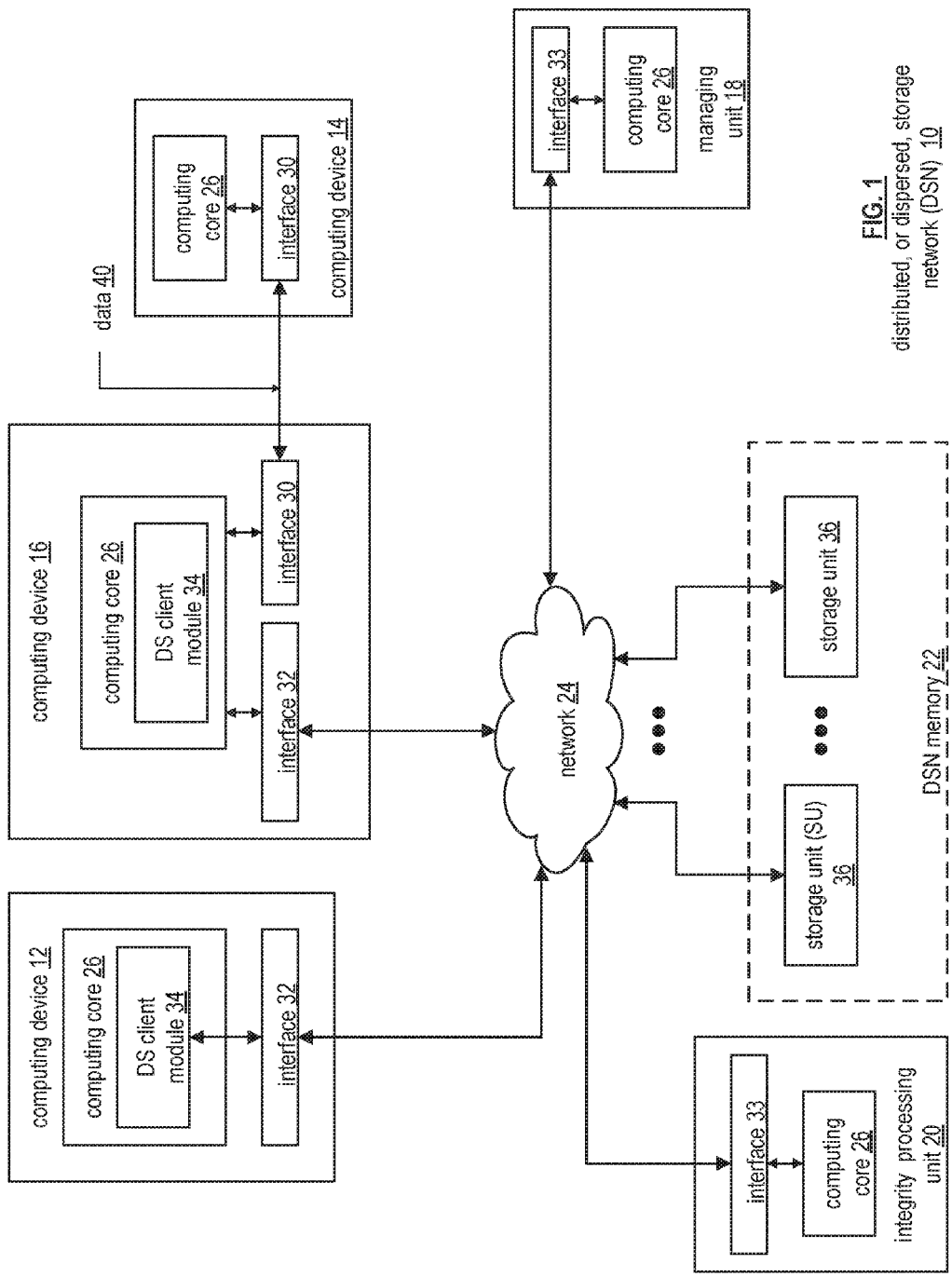
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
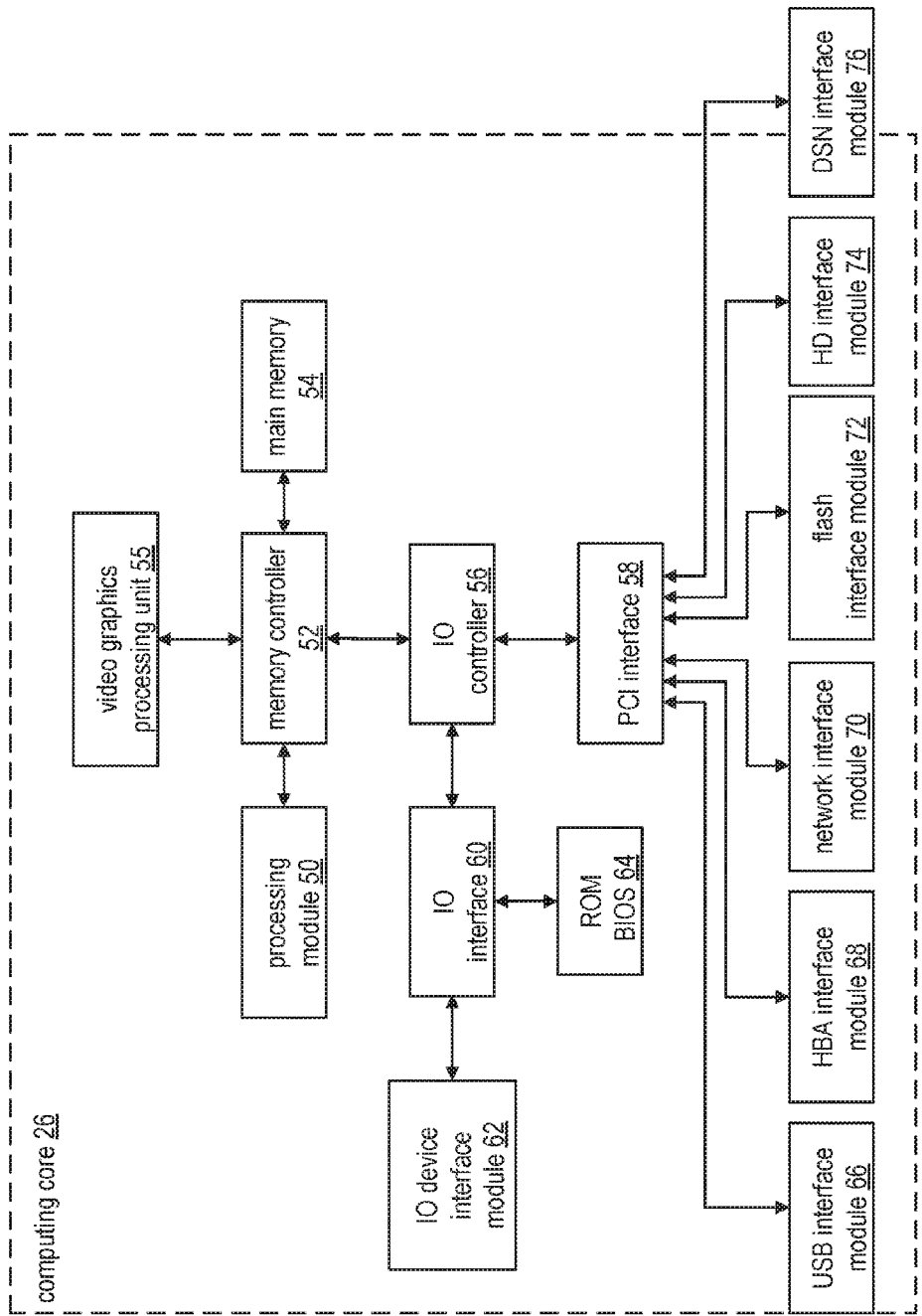
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
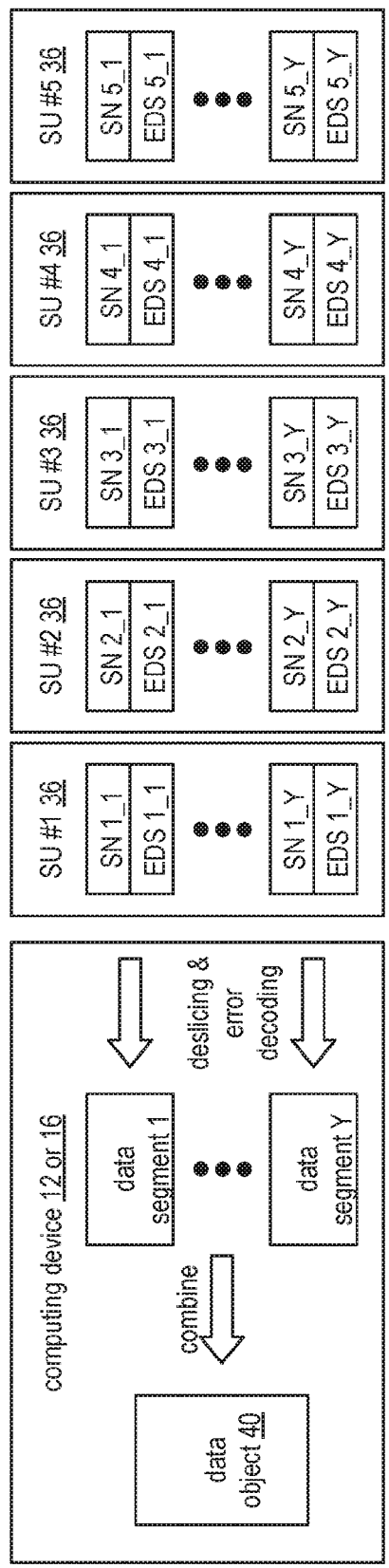
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

When mutable (prone to change) objects are stored on a DSN (metadata nodes, index nodes), and the name is deterministically derived (such as from the hash of a name), the data may be arbitrarily written to any generation in the vault. During a read attempt, read requests must be issued to stores on all generations for that source, since the generation that holds it cannot be determined in advance. Among other things, this enables writing of new mutable objects even in the event the first generation is full. In a more optimized approach, rather than writing to a generation randomly, the DS processing unit will prefer the lowest numbered generation that is not yet full. Then when reading the requests need only be sent to generations that are full or the first generation after the last full one. For example, if generations 0, 1, and 2 are full, then read requests need to be sent to the stores representing that slice for generations 0, 1, 2, and 3.

Figure 9:
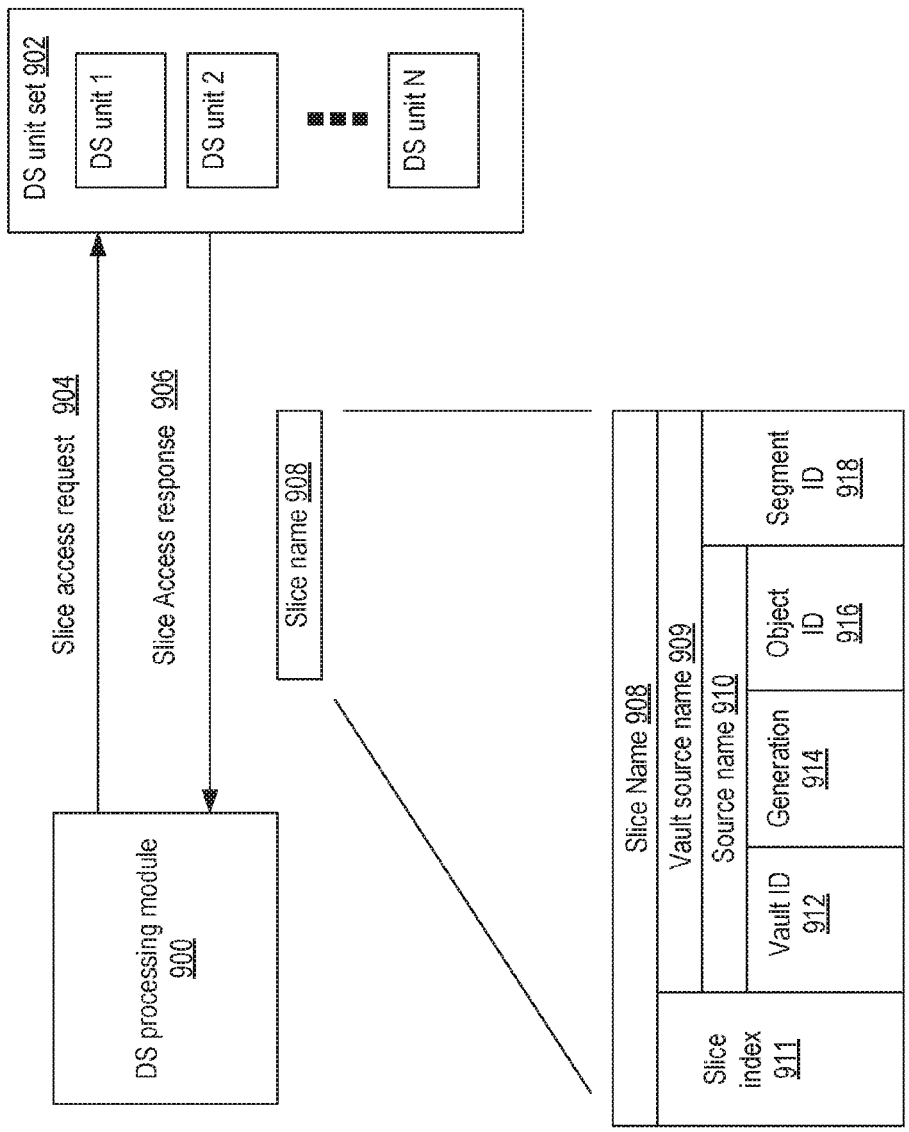
FIG. 9 is a schematic block diagram of another embodiment of a dispersed storage system that includes a dispersed storage (DS) processing module and a DS unit set in accordance with the present invention.

FIG. 9 is a schematic block diagram of another embodiment of a dispersed storage system that includes a dispersed storage (DS) processing module and a DS unit set. In particular, a method is presented for use in conjunction with one or more functions and features described in conjunction with FIGS. 1-2, 3-8, and also FIG. 9.

The DS unit set 902 includes a set of DS units (DS unit 1-N) utilized to access slices stored in the set of DS units. The DS processing module 900 may be implemented utilizing at least one of a distributed storage and task (DST) client module, a DST processing unit, a DS processing unit, a user device, a DST execution unit, and a DS unit. The system is operable to facilitate access of data in the DS unit set.

The DS processing module stores data as a plurality of encoded data slices in the DS unit set and retrieves at least some of the encoded data slices from the DS unit set to reproduce the data. The DS processing module issues one or more sets of slice access requests 904 to the DS unit set to store the encoded data slices in the DS unit set. A slice access request may include a request type indicator, a slice name 908, and an encoded data slice. For example, the slice access request includes a write slice requests type, an encoded data slice, and a slice name corresponding to the encoded data slice when storing the encoded data slice in a DS unit of the DS unit set.

The DS processing module issues another one or more sets of slice access requests to the DS unit set to retrieve the encoded data slices from the DS unit set where a slice access request of the other one or more sets of slice access request includes a read slice request type and a slice name corresponding to the encoded data slice associated with the retrieving. The DS processing module receives a slice access response 906 from one or more DS units of the DS unit set in response to the slice access request that includes the read slice request type. The slice access response 906 includes one or more of the request type indicator, the slice name, the encoded data slice, and a status code. The status code indicates status of a requested operation of a slice access request. For example, the status code indicates whether the requested operation was successful.

The slice name 908 utilized in the slice access request and the slice access response includes a slice index field 911 and a vault source name field 909. The slice index field includes a slice index entry that corresponds to a pillar number of a set of pillar numbers associated with a pillar width dispersal parameter utilized in a dispersed storage error coding function to encoded data to produce encoded data slices. The vault source name field 909 includes a source name field 910 and a segment ID field 918. The segment ID field 918 includes a segment ID entry corresponding to each data segment of the plurality of data segments that comprise the data. The source name field 910 includes a vault identifier (ID) field 912, a generation field 914, and an object ID field 916. The vault ID field 912 includes a vault ID entry that identifies a vault of the dispersed storage system associated with the requesting entity. The generation field 914 includes a generation entry corresponding to a generation of a data set associated with the vault. Multiple generations of data may be utilized for the vault to distinguish major divisions of a large amount of data. The object ID field 916 includes an object ID entry that is associated with a data name corresponding to the data.

With regards to storing the data, the DS processing module receives the data and the data name associated with the data. The DS processing module segments the data to produce a plurality of data segments in accordance with a segmentation scheme. The DS processing module generates a set of slice names for each data segment of the plurality of data segments. The generating includes a series of steps. In a first step, the DS processing module identifies a vault ID based on the request. For example, the DS processing module performs a registry lookup to identify the vault ID based on a requesting entity ID associated with request. In a second step, the DS processing module generates a generation field entry based on utilization of other generation entries associated with the vault ID. The DS processing module selects a generation ID associated with a generation that is not yet full and is just greater than a previous generation ID corresponding to a generation that is full. For example, the DS processing module accesses a generation utilization list of a registry to identify a fullness level associated with each potential generation ID to identify a generation ID that is not full and is just one generation ID larger than a previous generation ID that is full. In a third step, the DS processing module generates an object ID entry. The generating includes at least one of generating an object ID based on a random number, performing a deterministic function (e.g., a hashing function) on the data name to produce the object ID entry, and performing the deterministic function on at least a portion of the data to produce the object ID entry. In a fourth step, for each data segment, the DS processing module generates a set of slice names where each slice name includes a slice index entry corresponding to a pillar number of the slice name, the vault ID entry, the generation entry, the object ID entry, and a segment number corresponding to the data segment (e.g., starting at zero and increasing by one for each data segment).

With further regards to storing the data, the DS processing module encodes the plurality of data segments to produce a plurality of sets of encoded data slices using a dispersed storage error coding function. The DS processing module generates one or more sets of slice access requests that includes the sets of slice names and the plurality of sets of encoded data slices. The DS processing module outputs the one or more sets of slice access requests to the DS unit set.

With regards to retrieving the data, the DS processing module receives the data name associated with the data for retrieval. The DS processing module obtains a preliminary source name associated with the data. The obtaining includes identifying the vault ID (e.g., based on a registry lookup, a dispersed storage network (DSN) index lookup based on the data name), identifying the object ID (e.g., a DSN index lookup based on the data name, performing a deterministic function on the data name), and selecting one or more generation field entries. The selecting of the one or more generation field entries includes identifying a fullness level associated with each viable generation field entry and selecting the one or more generation field entries based on the fullness levels of each of the one or more generation field entries. For example, the DS processing module accesses the generation utilization list and selects generation field entries associated with each generation that is full and a next generation ID that is not full where the next generation ID is one greater than a greatest generation ID of generation IDs associated with full generations. For each generation of the one or more generation field entries, the DS processing module generates one or more source names that include the generation, the vault ID, and the object ID.

For each source name of the one or more source names, the DS processing module generates one or more sets of slice names that includes the source name, a slice index, and a segment ID of the at least one data segment of the plurality of data segments. The DS processing module generates one or more sets of slice access requests that include read slice requests and the one or more sets of slice names. When reading, the requests need only be sent to generations that are full or the first generation after the last full one. For example, if generations 0, 1 and 2 are full, then read requests need to be sent to the stores representing that slice for generations 0, 1, 2 and 3.

The DS processing module outputs the one or more sets of slice access requests to the DS unit set. The DS processing module receives a slice access responses from the DS unit set and decodes the received slice access responses using the dispersed storage error coding function to reproduce the data. The decoding includes utilizing at least a decode threshold number of favorable (e.g. successfully retrieved an encoded data slice) slice access responses corresponding to a common data segment of a common generation. Alternatively, the DS processing module attempts to retrieve a first data segment using multiple generation IDs to identify one generation ID of the multiple generation IDs associated with storage of the data for utilization of the one generation ID in retrieval of subsequent data segments. The method of operation is discussed in greater detail with reference to FIG. 9A.

Figure 9A:
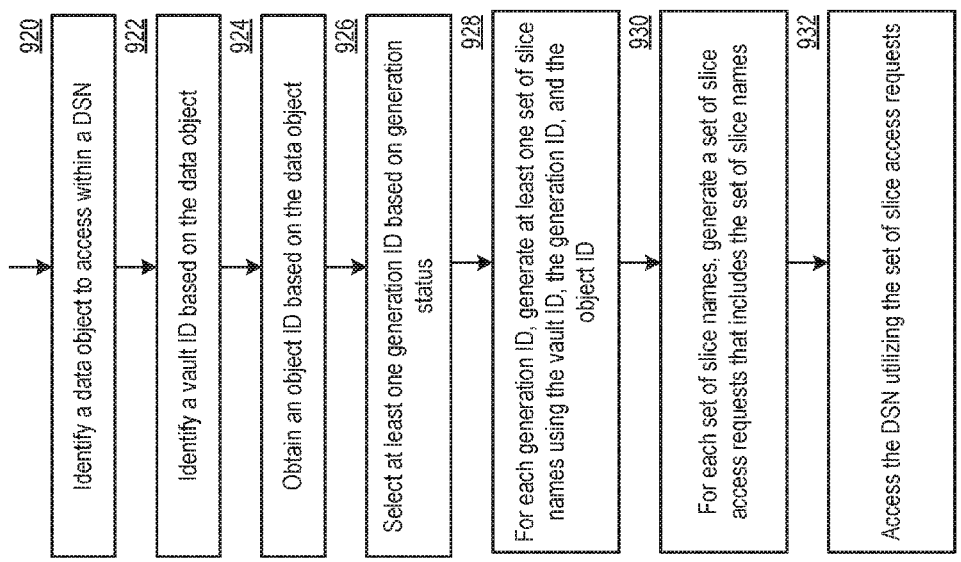
FIG. 9A is a flowchart illustrating another example of accessing data in accordance with the present invention.

FIG. 9A is a flowchart illustrating another example of accessing data. In particular, a method is presented for use in conjunction with one or more functions and features described in conjunction with FIGS. 1-2, 3-9, and also FIG. 9A.

The method begins with a step 920 where a processing module (e.g., a dispersed storage (DS) processing module) identifies a data object access within a dispersed storage network (DSN). The identifying may be based on receiving a request that includes one or more of a data name, a requester identifier (ID), a vault ID, an object ID, a source name, and data. The method continues at the step 922 where the processing module identifies a vault ID based on the data object. For example, the processing module performs a vault ID lookup based on the data name. As another example, the processing module performs the vault ID lookup based on the requester ID.

The method continues at step 924 where the processing module obtains an object ID based on the data object. The obtaining further includes obtaining the object ID based on one or more of a request type, the data, receiving the object ID, and the data name. For example, for a read request, the processing module accesses a DSN index (e.g., a directory) to retrieve the object ID based on the data name. As another example, for a write request, the processing module generates the object ID based on a deterministic function applied to the data name.

The method continues at step 926 where the processing module selects at least one generation ID based on generation status. The generation status indicates availability of one or more generation IDs (e.g., full or not full). The selecting further includes selecting the generation ID based on one or more of the request type and the generation status. For example, for a read request, the processing module selects each generation ID associated with a generation status that indicates that the generation is full and selects a generation ID that is one greater than a largest generation ID of one or more generation IDs that are full, if any. As another example, for a write request, the processing module selects a lowest generation ID associated with a generation that is not full.

For each generation ID, the method continues at step 928 where the processing module generates at least one set of slice names using the vault ID, generation ID, and the object ID. For each set of slice names, the method continues at step 930 where the processing module generates a set of slice access requests that includes the set of slice names. The generating may further be based on the request type. For example, for a write request, the processing module includes a set of slice names and includes a set of encoded data slices that are encoded, using a dispersed storage error coding function, from a corresponding data segment of the data. As another example, for a read request, the processing module includes a set of slice names.

The method continues at step 932 where the processing module accesses the DSN utilizing the set of slice access requests. The accessing includes outputting the set of slice access requests to the DSN. The accessing may further be based on the request type. For example, for the read request type, the processing module receives a slice access responses and decodes favorable slice access responses using the dispersed storage error coding function to reproduce one or more data segments of the data. As another example, for the write request type, the processing module confirms storage of the data object when receiving a write threshold number of favorable slice access responses from the DSN for each data segment of a plurality of data segments of the data.

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
    identifying, by a dispersed storage module, a data object to access within a DSN vault, where the DSN vault includes a virtual memory block associated with a portion of an overall namespace of the DSN;
    identifying, by a dispersed storage module, a vault ID based on the data object and the DSN vault, where the vault ID identifies a vault of the DSN associated with a data object requesting entity;
    obtaining, by a dispersed storage module, an object ID based on the data object, where the object ID is retrieved from a DSN index lookup based on a data name and performing a deterministic function on the data name;
    selecting, by a dispersed storage module, one or more generation IDs based on generation status, where the generation status is at least based on accessing a generation utilization list of a registry to identify a fullness level associated with each potential one of the one or more generation IDs for the DSN vault;
    for each of the one or more generation IDs, generating, by a dispersed storage module, at least one set of slice names using the vault ID, the generation ID, and the object ID; and
    for each set of slice names, generating, by a dispersed storage module, a set of slice access requests that includes the set of slice names; and
    accessing, by a dispersed storage module, DSN storage units utilizing the set of slice access requests; and
    wherein the accessing may further be based on a request type wherein, for a read request type, slice access responses are received, and favorable slice access responses decoded using a dispersed storage error coding function to reproduce one or more data segments of data and, for a write request type, storage of the data object is confirmed when receiving a write threshold number of favorable slice access responses from the DSN for each data segment of a plurality of data segments of the data.

2. The method of claim 1, wherein the dispersed storage module identifies a data object access request within a dispersed storage network (DSN).

3. The method of claim 2 wherein the identifying a data object to access within a DSN is based on receiving the data object access request that includes one or more of: a data name, a requester identifier (ID), a vault ID, an object ID, a source name, or data.

4. The method of claim 1, wherein the identifying a vault ID is based on an ID lookup based on a data name.

5. The method of claim 1, wherein the identifying a vault ID is based on a data object requester ID.

6. The method of claim 1, wherein the obtaining further includes obtaining the object ID based on one or more of: a request type, data, receiving the object ID, or a data name.

7. The method of claim 1, wherein the generation status further indicates availability of one or more generation IDs.

8. The method of claim 1, wherein the fullness level indicates full or not full.

9. The method of claim 1, wherein the selecting further includes selecting the generation IDs based on one or more of: a request type and the generation status.

10. The method of claim 1, wherein the selecting, for a read request, includes selecting each of the generation IDs associated with a generation status that indicates that a generation is full and selects a generation ID that is one greater than a largest generation ID of one or more generation IDs that are full, if any.

11. The method of claim 1, wherein the selecting, for a write request, selecting a lowest generation ID associated with a generation that is not full.

12. The method of claim 1, wherein the generating, for a write request, includes a set of slice names and includes a set of encoded data slices that are encoded, using a dispersed storage error coding function, from a corresponding data segment of the data.

13. The method of claim 1, wherein the generating, for a read request, the processing module includes a set of slice names.

14. The method of claim 1, wherein the accessing includes outputting the set of slice access requests to the DSN.

15. A computing device of a group of computing devices of a dispersed storage network (DSN), the computing device comprises:
    an interface;
    a local memory; and
    a dispersed storage module operably coupled to the interface and the local memory, wherein the processing module functions to:
    identify a data object to access within a DSN vault, where the DSN vault includes a virtual memory block associated with a portion of an overall namespace of the DSN;
    identify a vault ID based on the data object and the DSN vault, where the vault ID identifies a vault of the DSN associated with a data object requesting entity;
    obtain an object ID based on the data object, where the object ID is retrieved from a DSN index lookup based on a data name and performing a deterministic function on the data name;
    select at least one or more generation IDs based on generation status, where the generation status is at least based on accessing a generation utilization list of a registry to identify a fullness level associated with each potential one of the one or more generation IDs for the DSN vault;
    for each of the one or more generation IDs, generate at least one set of slice names using the vault ID, the generation ID, and the object ID; and
    for each set of slice names, generate a set of slice access requests that includes the set of slice names; and access DSN storage units utilizing the set of slice access requests, and wherein the access may further be based on a request type wherein, for a read request type, slice access responses are received, and favorable slice access responses decoded using a dispersed storage error coding function to reproduce one or more data segments of the data and, for a write request type, storage of the data object is confirmed when receiving a write threshold number of favorable slice access responses from the DSN for each data segment of a plurality of data segments of the data.

16. A method for execution by one or more processing modules of one or more computing devices of a dispersed storage network (DSN), the method comprises:

receiving, by a dispersed storage module, a data name for retrieval from DSN storage units;

identifying, by a dispersed storage module, a data object based on the data name to access within a DSN vault, where the DSN vault includes a virtual memory block associated with a portion of an overall namespace of the DSN;

identifying, by a dispersed storage module, a vault ID based on the data object and the DSN vault, where the vault ID identifies a vault of the DSN associated with a data object requesting entity;

obtaining, by a dispersed storage module, an object ID based on the data object, where the object ID is retrieved from a DSN index lookup based on a data name and performing a deterministic function on the data name;

selecting, by a dispersed storage module, each generation of the DSN vault that is full for a corresponding source name and a next generation of the DSN vault after a last full generation, where a DSN vault is full at least based on accessing a generation utilization list of a registry to identify a fullness level associated with each potential generation IDs for the DSN vault;

for each generation of the DSN vault selected, generating, by a dispersed storage module, at least one set of slice names using the vault ID, a generation ID, and the object ID; and for each set of slice names, generating, by a dispersed storage module, a set of slice access requests to read slices that includes the set of slice names; and outputting, by a dispersed storage module, the slice access requests to a DS (dispersed storage) unit set;

receiving, by a dispersed storage module, at least a decode threshold of the set of slices; and decoding, by a dispersed storage module, the received slices to produce the data object.

* * * * *